United States Patent
Lohwasser

(10) Patent No.: US 7,235,757 B2
(45) Date of Patent: Jun. 26, 2007

(54) DEVICE FOR TIGHTLY FASTENING AT LEAST TWO MEMBERS

(75) Inventor: Daniela Lohwasser, Berne (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 11/316,152

(22) Filed: Dec. 22, 2005

(65) Prior Publication Data

US 2006/0191979 A1 Aug. 31, 2006

(30) Foreign Application Priority Data

Dec. 22, 2004 (DE) .................. 10 2004 062 997

(51) Int. Cl.
B23K 10/00 (2006.01)
(52) U.S. Cl. .................. 219/121.45; 219/121.58; 219/121.48; 228/112.1
(58) Field of Classification Search ............ 219/137 R, 219/121.45, 121.46, 158, 153, 121.48; 228/112.1, 228/216
See application file for complete search history.

(56) References Cited

U.S. PATENT DOCUMENTS

| 3,591,755 A | * | 7/1971 | Cushman | .................. 219/50 |
| 4,075,453 A | * | 2/1978 | Roberts | .................. 219/125.1 |
| 5,641,417 A | * | 6/1997 | Glagola et al. | ..... 219/137 WM |
| 6,718,627 B2 | * | 4/2004 | Kim | .................. 29/760 |

FOREIGN PATENT DOCUMENTS

| DE | V 7164 AZ | 6/1956 |
| DE | 1 113 527 B | 9/1961 |
| DE | 2 339 615 | 2/1974 |
| DE | 201 03 412 U1 | 4/2002 |
| FR | 1 363 358 | 5/1964 |
| GB | 585977 | 3/1947 |
| JP | 405185580 A * | 7/1993 |

* cited by examiner

Primary Examiner—Mark Paschall
(74) Attorney, Agent, or Firm—Christopher Paradies; Fowler White Boggs Banker P.A.

(57) ABSTRACT

A device for clamping at least two components for use in friction stir welding supports the components and holds the components in place using a plurality of channels placed under vacuum for clamping of the components during friction stir welding. Both sides of a welding backup plate may have a mounting device including the vacuum channels, for example. The mounting device may have a contoured support surface for supporting components with a simple or complex surface curvature, allowing the same device to be rapidly configured to a plurality of component types with varying surface curvatures.

11 Claims, 1 Drawing Sheet

DEVICE FOR TIGHTLY FASTENING AT LEAST TWO MEMBERS

RELATED APPLICATION

This application claims the priority of German Patent Application DE 10 2004 062 997.8, submitted on Dec. 22, 2004, which hereby is incorporated into this application by reference.

1. Field of the Invention

The field relates to a device for clamping at least two components, in particular components for aircraft, in order to join the components by means of a weld seam formed between two component edges via friction stir welding, wherein the components each are accommodated by several supporting elements, and a welding backup plate is arranged under the weld seam.

2. Background of the Invention

Known devices for clamping components for friction stir welding consist of a massive, flat substructure, on which the components to be welded rest. Massive tension jacks mechanically clamp the components during the welding process. The tension jacks must be laid in a rather stable manner owing to the high mechanical forces that arise during friction stir welding. For example, such tension jacks can be realized by means of bolted gripping jaws or hydraulically actuated gripping jaws.

Both cases are associated with a high initial outlay. In addition, the mechanical tension jacks limit the dimensions for the components to be machined, since the tension jacks must be brought as close to the weld formation area as possible in order to hold the components down on a welding backup plate as effectively as possible in this area. Very large and complex components, e.g., fuselage shells in aircraft construction, can hence not be joined via friction stir welding using the known devices for clamping components.

Further, clamping the components to be joined via friction stir welding is a rather time-consuming endeavor.

In addition, the massive configuration of known devices for clamping components for friction stir welding necessitates a high level of heat dissipation from the weld formation area, so that the rate of advance must be reduced in many cases.

Finally, these previously known devices do not enable simple and easy adjustment to different component geometries, in particular different components with single and double curves. Rather, a special device must be provided for each existing component geometry for clamping purposes, which significantly increases the storage outlay and costs.

Also known are flat vacuum clamping tables, which reduce the time needed for clamping the components to be machined. However, these vacuum clamping tables also have a very massive structure, once again posing the problem of an elevated heat removal from the weld formation area.

Further, the flat vacuum clamping tables are not easily adapted to various component geometries.

In light of the above disadvantages, the previously known embodiments of devices for clamping components for purposes of friction stir welding are only conditionally suitable for the cost-effective and efficient incorporation into contemporary, highly flexible production processes.

SUMMARY OF THE INVENTION

For example, the disadvantages of the known configurations of devices for clamping components for purposes of friction stir welding can be largely avoided.

One example of the device provides for a device with the following features: a plurality of supporting elements and a welding backup plate having two sides; in this example of the device, at least two components are accommodated by the plurality of supporting elements, and the welding backup plate is arranged under a weld seam such that the two sides of the welding backup plate each have at least one mounting device with a plurality of channels capable of being placed under a vacuum for clamping of the at least two components during friction stir welding of the weld seam between the at least two components.

The fact that both sides of the welding backup plate each have at least one mounting device that can be exposed to a vacuum for securing the components makes it possible to apply a vacuum to easily and rigidly clamp together the components to be butt-jointed via friction stir welding. In addition, a device, may enable the variable clamping of various components with single or double curves using one and the same device, wherein only the mounting devices and/or welding backup plate is substantially tailored to the various component geometries.

In another advantageous embodiment of the device, the mounting devices are detachably secured on a substructure. For example, this enables a rapid and simple exchange of ready mounting devices for various component geometries and/or component dimensions. In addition, the substructure can establish a stable, load-bearing connection to a base plate, on which the entire device rests.

In another advantageous embodiment, a surface geometry of the mounting devices is tailored to a component surface geometry and/or component dimensions.

This embodiment enables the reliable clamping of components with different geometries and/or varying dimensions. In particular, For example, a device makes it easy to reliably fix components with single and/or double curves in place for purposes of friction stir welding, wherein only the mounting devices and potentially the welding backup plate need to be exchanged to accommodate different components having curvatures.

In another advantageous embodiment of the device, one width of the mounting devices is especially tailored to different material thicknesses of the components.

This embodiment ensures that the device can be flexibly tailored to a plurality of various components, in particulars to components with different material thickness. In this case, the width of the mounting devices increases as does the material thickness of the components to be welded, so as to achieve a sufficient contact pressure during the friction stir welding process. This is because the forces encountered during friction stir welding increase as material thickness grows. In addition, the mounting devices are each individually tailored to components with a single and/or double curve as needed.

In another example, the welding backup plate is substantially arranged centrally below the weld seam in a weld formation area, and is replaceable.

Replaceability enables an easy exchange of the backup plate, which is susceptible to wear. In addition, the components to be welded may be supported in an substantially symmetrical manner, which may help to improve the weld seam quality. Further, a fine adjustment to the geometric shape of the components in the weld formation area may be achieved if needed, such as by using different backup plates for various component geometries. The welding backup plate may be made out of a metallic material to ensure a sufficient service life or wear resistance during friction stir welding operations.

In another example, the welding backup plate and mounting devices form a support surface. This ensures that the components to be connected via friction stir welding may be layed as flush as possible against the device, yielding a good height and dimensional stability of the weld seam formed via friction stir welding. The welding backup plate and mounting devices here form an imaginary, substantially continuous support surface.

In another embodiment of the device, the components in the weld formation area may be pressed against the welding backup plate by at least one contact element, in particular, a pressure roller. This can further improve positioning of the components in the weld formation area during friction stir welding.

In another advantageous embodiment, the support elements are movable for purposes of adjustment to various surface geometries and/or dimensions of the components.

As a result, components with varying geometries and/or dimensions may be flexibly accommodated. A plurality of support elements is here preferably arranged on either side of the mounting devices, so that even large components can be securely accommodated. The support elements are here designed for substantially perpendicularly movement. In addition, the support elements may also be positioned in the plane.

In another example, the support elements have connecting elements, for example, suction cups, for fixing the components in place. This embodiment enables a reliable grip even in cases of large components, e.g., fuselage shells. Connecting elements other than suction cups can also be used, e.g., clamps or the like.

In another advantageous embodiment, the mounting devices and/or the substructure are provided with a heat-insulating material. This ensures that the heat that arises during the friction stir welding process in the weld formation area or weld seam only dissipates slightly into the device, thereby enabling an increase in the rate of advance of the friction stir welding tool.

In another example, at least one positioning unit is arranged in the area of the mounting devices and/or the substructure in order to advance and/or align the components relative to the welding backup plate and/or mounting devices.

This embodiment enables an at least semiautomatic positioning of the components to be welded on the device. The positioning units can be designed as articulated brackets with suction cups at their ends. The articulate brackets can be enabled using actuators, for example, in particular hydraulic pistons, electric drives or the like. In addition, the articulated brackets can also be fitted with sensors for acquiring their spatial position or the spatial position of the components. The articulated brackets are controlled with a suitable open and closed-loop control system. The open and closed-loop control system makes it possible to simultaneously control the friction stir welding tool and mounting devices.

BRIEF DESCRIPTION OF THE FIGURES

The drawing shows:

DETAILED DESCRIPTION OF THE DRAWINGS

Figure 1:
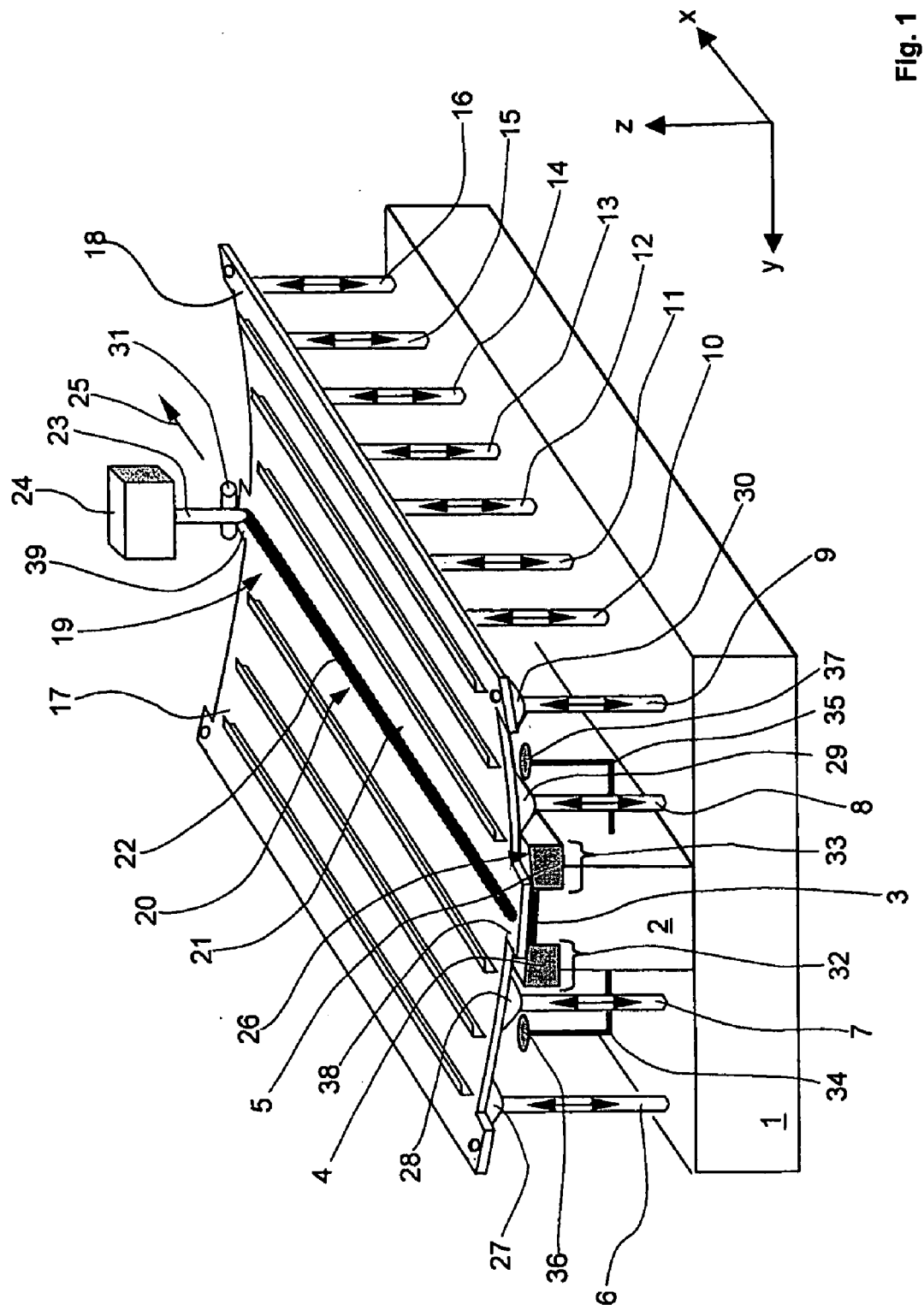
FIG. 1 shows a perspective view of one example of a device for clamping components during the friction stir welding of components along component edges. The following example described and the drawing rendered are illustrative and are not to be read as limiting the scope of the invention as it is defined by the appended claims.

FIG. 1 shows a perspective view of of an exemple of a device for clamping components during friction stir welding of components along component edges.

Among other things, a device may comprise a base plate 1, a substructure 2, a welding backup plate 3 and the mounting devices 4, 5. The support elements are preferably each arranged like a matrix, each spaced uniformly apart from the other. In the example of FIG. 1, only the support elements 6 to 16 have been shown to gain a clearer graphical overview.

A first component 17 and second component 18 rest on the mounting devices 4, 5 as well as support elements 6 to 16. The components 17, 18 can consist of sheets or more complex components, e.g., segments of fuselage shells or the like.

The components 17, 18 are connected in a weld forming area 19 along the component edges 20, 21 via the weld seam 22. The weld seam 22 is formed in a known manner via friction stir welding using a suitable friction stir welding tool 23, which is situated on a tool carrier 24. For example, the tool carrier 24 is guided by a computer-controlled portal robot (not shown in any greater detail) in the direction of the arrow 25 along the component edges 20, 21 to create the weld seam 22.

Since considerable mechanical forces arise during friction stir welding, the components 17, 18 must be securely fixed or clamped by a device. The weld formation area 19 lies loosely on the welding backup plate 3. The upper sides of the mounting devices 4, 5 facing the components 17, 18 have a plurality of channels (not shown in any greater detail), which may be placed under a vacuum.

For example, the channels can be milled into the upper sides of the mounting devices 4, 5 in a checkerboard pattern, or incorporated in some other way. As an alternative, a matrix of boreholes can be incorporated into the upper sides of the mounting devices 4, 5 to be able to establish a vacuum between the components 17, 18 and the mounting devices 4, 5.

Also situated on the edge areas of the mounting devices 4, 5 are sealing strips in order to maintain the vacuum between the components 17, 18 and the mounting devices 4, 5. As a result of the vacuum between the components 17, 18 and the mounting devices 4, 5, the ambient air pressure exposes the components 17, 18 to a high contact pressure. Given the generally large components 17, 18, relatively high contact forces can hence be generated, so that the components 17, 18 do not shift, even at high rates of advance for the friction stir welding tool 23.

The mounting devices 4, 5 are detachably connected with the substructure 2, e.g., by means of screws, clamps, latches or the like, so as to ensure an easy exchange of the mounting devices 4, 5 as a function of the geometry and/or the dimensions of the components 17, 18 to be clamped in place. In addition, the substructure can be detachably secured to the base plate 1 in order to achieve a higher flexibility with respect to varying components.

To buttress the action of the mounting devices 4, 5, particularly in the case of large components 17, 18, a device may include support elements 6 to 16. The support elements 6 to 16 may each be moved independently from each other in the direction of the black double arrows, i.e., in the z-direction. This makes it possible to reliably and securely clamp components with varying dimensions and/or geometry using the device according to one example, also. In addition, the support elements 6 to 16 may be designed to move in the x and y-direction, also.

The welding backup plate 3 and upper sides of the mounting devices 4, 5 form a roughly continuous support surface 26, on which the components 17, 18 rest on either side of the component edges 20, 21. This fictive support surface 26 continues to both sides in the form of the support elements 6 to 16 arranged like a matrix.

To improve the support action of all support elements 6 to 16, the latter have terminal connecting elements, e.g., in the form of suction cups 27 to 30. In this case, all support elements 6 to 16 along with the other support elements (not shown) are fitted with suction cups, wherein the suction cups 27 to 30 are penciled in on FIG. 1 to represent the suction cups that cannot be shown. It should be noted in this conjunction that the support elements do not absolutely have to be fitted with suction cups to achieve a sufficient clamping action for the device. The contact forces generated via the mounting devices 4, 5 as the result of a vacuum are generally sufficient to achieve reliable fixation during the friction stir welding process.

To further improve the clamping effect of the mounting devices, 4, 5, the tool carrier 24 can have a pressure roller 31. The pressure roller 31 tightly presses the component edges 20, 21 against the welding backup plate 3 once again just prior to the friction stir welding tool 23 welds the components 17, 18 in the weld formation area 19. The pressure roller 31 is also not absolutely necessary for achieving a sufficient contact force in the area of the component edges 20, 21 in the weld formation area 19.

The measures described above for clamping the components 17, 18 prevent the components 17, 18 from slipping during the friction stir welding process, so that the components 17, 18 can be connected at maximum dimensional stability via friction stir welding.

The greater the material thickness of the components 17, 18, the greater a width 32, 33 must be selected for the mounting devices 4, 5 in order to achieve sufficiently high contact forces by generating the vacuum.

When clamping components 17, 18 with a geometric shape differing from the one illustrated in FIG. 1, the mounting devices 4, 5, may be changed out, replacing them with mounting devices suitably tailored to the geometric shape of the components. Correctly designing the upper sides of the respective ready mounting devices and their widths makes it possible to tailor a device to a plurality of different components with varying geometric dimensions with minimal outlay. In particular, it is also possible to reliably and securely clamp complex, simple and/or double-curved components just by changing out correspondingly designed mounting devices. In addition, it may be necessary to provide special substructures and special backup plates for purposes of adjustment to component geometries and/or dimensions. Fixation then takes place in the outside area of the components by means of the so-called "support element field" that may be adapted to a plurality of varying component geometries and/or dimensions and consists of a plurality of support elements arranged as a matrix.

However, by using the examples of the device described, it is no longer necessary to provide a complete, individual clamping device for each component geometry encountered in the production process, which yields a significant cost and time savings.

Also situated on either side of the substructure 2 are positioning units 34, 35, which enable a fine positioning of the applied components 17, 18 relative to the welding backup plate 3. In this case, the drawing on FIG. 1 shows only two positioning units 34, 35. Other positioning units are arranged on either side of the substructure 2, preferably each spaced uniformly apart, to achieve a more efficient positioning of the components 17, 18 along the x-direction. The positioning units 34, 35 each have connecting elements, e.g., suction cups 36, 37, for repeated detachable connection to the components 17, 18. The suction cups 36, 37 are again representative for the other connecting elements on the positioning units (not shown in any greater detail).

The substructure 2, base plate 1 and mounting devices 4, 5 are formed with a metallic material, e.g., with an aluminium alloy, with steel or the like. As opposed to the described material selection, at least the mounting devices 4, 5 can also be made out of an only slightly thermally conductive material, e.g., a suitable ceramic and/or plastic. This diminishes the heat dissipation from the weld formation area 19, thereby enabling higher rates of advance at the same quality of weld seam with the friction stir welding tool 23.

Further, the components 17, 18 exhibit small outlet areas 38, 39 in the weld formation area 19, which are separated out upon conclusion of the friction stir welding process. As shown by example in the drawing on FIG. 1, the outlet areas are designed as small, strap-like continuations. As a result, the weld seam 22 always runs all the way up to a front or rear component edge of the components 17, 18. By contrast, if the friction stir welding tool 23 were only to extent up to the front or rear component edge, the weld seam 22 would be only incompletely formed in these edge areas.

In addition, it must be noted that "comprising" does not preclude any other elements or steps, and "one" or "a" does not preclude a plurality. Further, it should be noted that features or steps that were described with reference to one of the above exemplary embodiments can also be used in combination with other features or steps from other exemplary embodiments described above. Reference numbers in the claims are not to be regarded as limiting.

REFERENCE LIST

1 Base plate
2 Substructure
3 Welding backup plate
4 Mounting device
5 Mounting device
6 Support element
7 Support element
8 Support element
9 Support element
10 Support element
11 Support element
12 Support element
13 Support element
14 Support element
15 Support element
16 Support element
17 First component
18 Second component
19 Weld formation area
20 Component edge
21 Component edge
22 Weld seam
23 Friction stir welding tool
24 Tool carrier 25 Arrow
26 Support surface
27 Suction cup
28 Suction cup
29 Suction cup
30 Suction cup
31 Pressure roller
32 Width
33 Width
34 Positioning unit
35 Positioning unit
36 Suction cup
37 Suction cup
38 Outlet area
39 Outlet area

The invention claimed is:

1. A device for clamping at least two components for joining by friction stir welding for an aircraft, the device comprising:
a plurality of supporting elements;
a welding backup plate having two sides;
the at least two components each are accommodated by the plurality of supporting elements, and the welding backup plate is arranged under a weld seam such that, wherein both the two sides of the welding backup plate each have at least one mounting device with a plurality of channels capable of being placed under a vacuum for clamping of the at least two components during friction stir welding of the weld seam between the at least two components.

2. The device according to claim 1, further comprising a substructure, wherein the at least one mounting device is detachably secured to the substructure.

3. The device according to claim 1, wherein a surface geometry of the at least one mounting device is tailored to a surface geometry of the at least two components, to dimensions of the at least two components, or to both the geometry of the at least two components and the dimensions of the at least two components.

4. The device according to claim 1, wherein one width of the at least one mounting device is especially tailored to varying material thicknesses of the at least two components.

5. The device according to claim 1, wherein the welding backup plate is replaceably arranged centrally below the weld seam in a weld formation area.

6. The device according to claim 1, wherein the welding backup plate and the at least one mounting device form a support surface.

7. The device according to claim 5, wherein the at least two components in the weld formation area are capable of being pressed against the welding backup plate by a pressure roller.

8. The device according to claim 1, wherein the plurality of supporting elements are movable for purposes of adjustment to various surface geometries or dimensions of the at least two components or both.

9. The device according to claim 1, wherein the plurality of supporting elements each have at least one connecting element such that the at least two components are fixed in place.

10. The device according to claim 2, wherein the at least one mounting device or the substructure or both include a heat-insulating material.

11. The device according to claim 2, wherein at least one positioning unit is arranged in an area of the at least one mounting device or the substructure or both, such that the at least one component advances, aligns, or both advances and aligns relative to the welding backup plate or the at least one mounting device or both.

* * * * *